June 23, 1959 W. H. POWERS 2,891,580
TAIL PIPE SPOUT

Filed Dec. 11, 1953 2 Sheets-Sheet 1

INVENTOR.
Walter H. Powers.
BY
Harness, Dickey & Pierce.
ATTORNEYS

June 23, 1959 W. H. POWERS 2,891,580
TAIL PIPE SPOUT
Filed Dec. 11, 1953 2 Sheets-Sheet 2
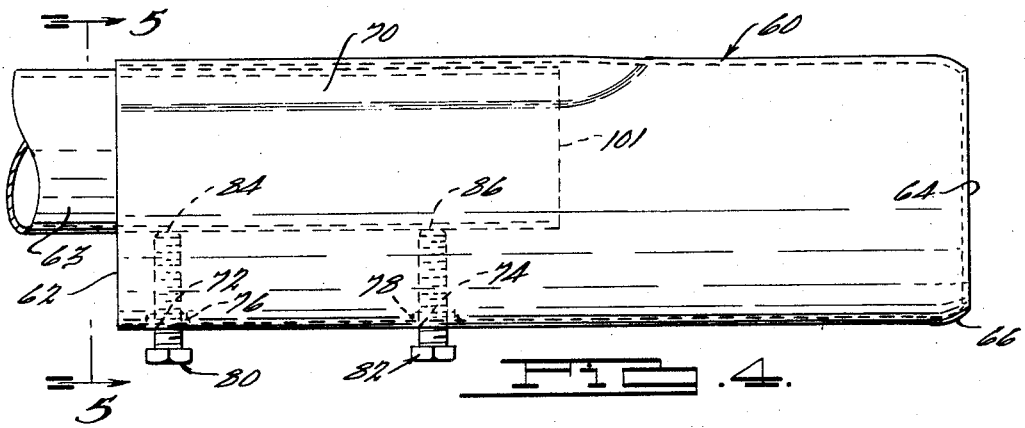
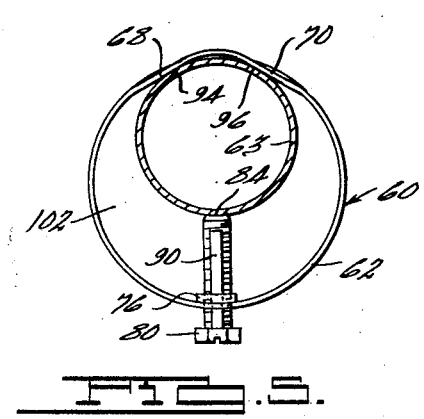
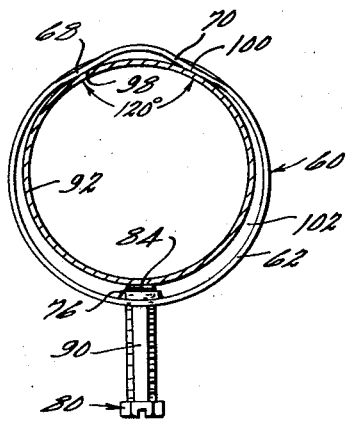
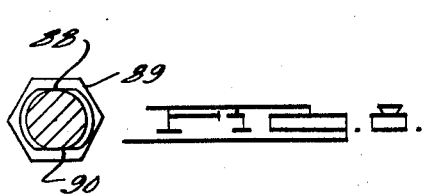
INVENTOR.
Walter H. Powers.
BY
Harness, Dickey & Pierce.
ATTORNEYS.

United States Patent Office 2,891,580
Patented June 23, 1959

2,891,580

TAIL PIPE SPOUT

Walter H. Powers, Jackson, Mich., assignor to Walker Manufacturing Company of Wisconsin, Racine, Wis., a corporation of Wisconsin Application December 11, 1953, Serial No. 397,531

13 Claims. (Cl. 138—46.5)

This invention relates to motor vehicle exhaust pipe extensions or tail pipe spouts and, more particularly, to a tail pipe extension adapted to protect a motor vehicle body and rear bumper from the destructive effect of spent exhaust gases and which may be easily and rigidly attached to varying sizes of exhaust pipes.

Various types of exhaust pipe extensions for motor vehicles have been provided heretofore in the art. The ordinary exhaust pipe extension is usually connected to the exhaust tail pipe of a motor vehicle by means of a circumferential contact clamp which properly fits only one size exhaust pipe, thereby requiring the handling by a dealer of various sizes of exhaust pipe extensions. Furthermore, it has been found that the use of a circumferential contact clamp to connect a tail pipe extension on a tail pipe ordinarily results in a poor joint therebetween because of a cantilever effect produced by such clamp which causes the exhaust pipe extension to wobble on the exhaust tail pipe.

The present invention provides an exhaust pipe extension including a tubular member, the outer end of which has a vertically disposed converging edge adapted to divert the spent exhaust gases away from the vehicle body and rear bumper, and the inner end of which is provided with a novel clamping means. The tubular member is of a size large enough to slidably receive varying sizes of exhaust tail pipes from small to large, and said clamping means is adjustable and adapted to rigidly hold such various sizes of exhaust tail pipes in said tubular member with a solid full-line contact therebetween.

An object of this invention is to provide a tail pipe spout adapted to be rigidly attached to exhaust tail pipes of different diameters.

Another object of the invention is to provide a tail pipe spout having a novel clamping arrangement which provides a solid full-line contact between an exhaust tail pipe and the tail pipe spout, thereby preventing the tail pipe spout from wobbling on the exhaust tail pipe.

A further object is to provide a ventilated tail pipe spout, whereby air is conducted throughout substantially the full length of the tubular spout body to minimize the heat action of the spent gases.

A further object of this invention is to provide a tail pipe spout for a motor vehicle which is simple and compact in construction, economical to manufacture, and adapted to divert the spent exhaust gases away from the vehicle body.

Other objects, features and advantages of the present invention will become apparent from the following detailed description taken in conjunction with the accompanying drawings, in which:

Figure 4 is a side elevational view of a second embodiment of a tail pipe spout illustrating the features of the present invention;

Figure 5 is an end view of the structure illustrated in Fig. 4, taken on the line 5—5 thereof and showing the tail pipe spout connected to a small diameter exhaust tail pipe;

Figure 6 is a view similar to that of Fig. 5, but showing the tail pipe spout connected to a large diameter exhaust tail pipe;

Figure 7 is an elevational view of one of the clamping bolts employed in the embodiment of Figs. 4 through 6, showing one of the flattened surfaces thereon; and Figure 8 is a cross sectional view of the clamping bolt illustrated in Fig. 7, taken on the line 8—8 thereof.

Figure 1:
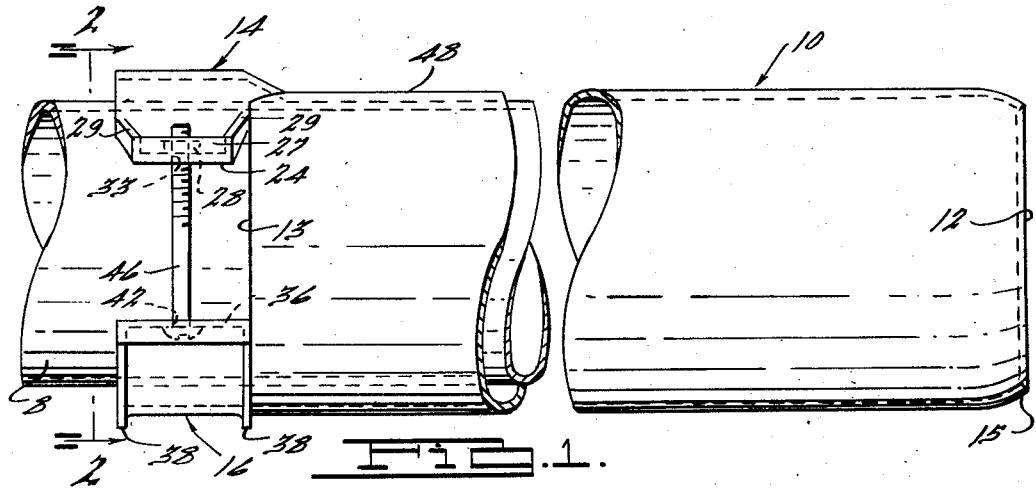
Figure 1 is a side elevational view of a tail pipe spout embodying the features of the present invention.
Figure 2:
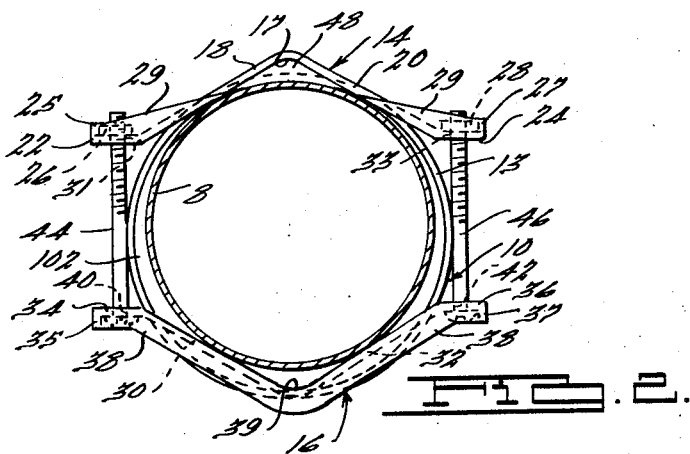
Figure 2 is an end view of the structure illustrated in Fig. 1, taken on the line 2—2 thereof and showing the tail pipe spout connected to a large diameter exhaust tail pipe.
Figure 3:
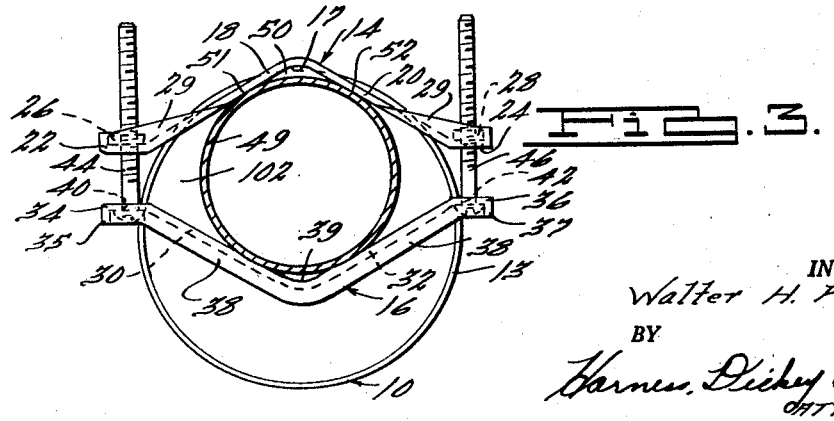
Figure 3 is a view similar to that of Fig. 2, but showing the tail pipe spout connected to a small diameter exhaust tail pipe.

A tail pipe spout made in accordance with the principles of the present invention is illustrated in Figs. 1 through 3, and includes a tubular member 10 having an outer end 12 which is provided with a converging edge, as indicated at 15, to allow the spent exhaust gases to be diverted away from the vehicle chassis and rear bumper to prevent said gases from injuriously affecting these portions of the motor vehicle. The tubular member 10 is preferably made of tubing material similar to conventional exhaust pipe tubing and may be large enough in diameter to slidably receive the largest size exhaust tail pipe presently used on motor vehicles. The tubing may be made of corrosion-resistant material or of a material suitably treated, plated or coated to resist corrosion and to present an attractive appearance.

The inner end 13 of the tubular member 10 is squared off and adapted to slidably receive the outer end of a motor vehicle exhaust tail pipe as 8 and is secured thereto by a clamping means including a pair of opposed V-shaped members 14 and 16. As is best seen in Fig. 1, the upper V-shaped clamping member 14 is integral with the tubular member 10 and may be formed by any suitable method. The upper V-shaped clamping member 14 includes a pair of diverging or outwardly sloping portions 18 and 20 which are disposed tangent to the generatrix or inner periphery of the tubular member 10, with their inner ends joined in a V-junction 17. The sloping portions or arms 18 and 20 are provided with a pair of outwardly extending coplanar flanges 22 and 24 on their outer ends. As is best seen in Fig. 1, the flanges 22 and 24 have their outer edges turned upwardly, as illustrated at 25 and 27, respectively, to provide a seat for a pair of nuts 26 and 28, and to hold said nuts against rotation. The sides of the flanges 22 and 24 are provided with vertical stiffening ribs, as illustrated at 29, and with apertures 31 and 33 arranged to coact with nuts 26 and 28.

The lower V-shaped clamping member 16 is separately formed and includes a pair of diverging or outwardly sloping portions 30 and 32 having one end joined in a V-junction 39, similar to the upper clamping member 14, and provided with a pair of outwardly extending coplanar flanges 34 and 36. The outer edges of the flanges 34 and 36 are downturned as illustrated at 35 and 37, respectively. The sloping portions or arms 30 and 32 are provided with vertical stiffening ribs, as illustrated at 38, along the side edges thereof. The flanges 34 and 36 are provided with apertures 40 and 42, respectively, in which are slidably mounted threaded bolts 44 and 46, adapted to threadably engage the nuts 26 and 28, respectively, in the upper clamping member 14.

The illustrative embodiment of the invention is adapted to be easily affixed to various sizes of motor vehicle exhaust tail pipes. As is best seen in Figs. 1 and 2, an exhaust tail pipe 8 having a large diameter is securely held in the tail pipe spout member 10 and has a solid full-line contact therewith along the upper inner surface thereof, at line contact position 48. The lower clamping member 16 is adjustable upwardly by means of the bolts 44 and 46, and is adapted to hold the exhaust pipe 8 against the tubular member 10 along the solid full-line contact position 48. It will be seen that by arranging the upper clamping member 14 tangent to the generatrix of the tubular member 10 varying sizes of exhaust tail pipes may be rigidly secured to a tail pipe spout because of the solid full-line contact obtainable with such construction. This is best seen in Fig. 3, which illustrates a small diameter exhaust tail pipe 49 mounted in the tail pipe spout of Fig. 1 and having a solid full line contact therewith, at a contact position 50. The diverging arms 18 and 20 are slightly flexible and as shown in Fig. 3 will engage the smaller diameter exhaust tail pipe 49 at points such as 51 and 52.

A second embodiment of a tail pipe spout made in accordance with the principles of the present invention is illustrated in Figs. 4 through 8. The reference numeral 60 designates the tubular body member of the second embodiment which is provided with a vertical inner end 62 adapted to slidably receive a motor vehicle exhaust tail pipe as 63 and a vertical outer end 64. The outer end 64 is provided with a converging edge, as designated by the numeral 66. The tubular member 60 is preferably made of tubing material similar to conventional exhaust pipe tubing and may be large enough in diameter to slidably receive the largest size exhaust tail pipe presently used on motor vehicles. The tubing may be made of corrosion-resistant material or of a material suitably treated, plated or coated to resist corrosion and to present an attractive appearance.

As is best seen in Figs. 4 through 6, the tubular member 60 is provided along the upper side thereof with a pair of diverging or outwardly sloping flattened portions 68, 70 extending inwardly from the inner end 62 approximately half the length of the tubular member 60. The flattened portions 68 and 70 are disposed on opposite sides of the vertical centerline of the tubular member 60 at any suitable angle, although best results have been obtained when the angle between these portions is approximately 120°. The flattened portions 68, 70 are preferably formed from the wall of the tubular member 60 by any suitable method.

The tubular member 60 is provided with a pair of spaced apertures as 72, 74 disposed on the lower side and toward the inner end thereof and on the centerline of the tubular member. A pair of threaded members or nuts 76, 78 are fixed over the apertures 72 and 74, respectively, and are suitably secured in place as by welding. A pair of threaded bolts 80 and 82 are operatively mounted in the nuts 76 and 78, respectively, and are adapted to abut the lower side of the exhaust tail pipe 63, as at 84 and 86, whereby the exhaust tail pipe may be securely held against the diverging flattened portions 68 and 70.

As is best seen in Figs. 7 and 8, the bolts 80 and 82 are flattened on opposite sides as at 88 and 90, so that when they are screwed into the nuts 76 and 78, they will be tight and tend to bind to prevent them from working out due to vibration. The heads 89 of the bolts 80, 82 are provided with a suitable slot as 91 for the reception of the head of a screw-driver.

The embodiment of Figs. 4 through 8 is adapted to be easily affixed to various sizes of motor vehicle exhaust tail pipes. As is best seen in Figs. 5 and 6, a small diameter exhaust tail pipe as 63, or a large diameter exhaust tail pipe as 92, may be securely held in the tail pipe spout member 60 and have a pair of solid full-line contacts therewith along lines generally designated as 94, 96 and 98, 100 respectively. It will be seen that such solid full-line contacts with the tail pipe spout member 60 are obtainable for an appreciable length of the tail pipe spout up to a point as designated by the numeral 101 in Fig. 4.

As is best seen in Figs. 2, 3, 5 and 6, an important feature of the invention is the space 102, between the tubular members 10 and 60 and the exhaust tail pipe received in each of said members, which provides a ventilator conduit for transmitting cooling air throughout substantially the full length of the tubular spout body to minimize the heat action of the spent gases.

The tail pipe spout of the present invention may be chrome plated, porcelain coated or have any other desirable finish applied thereto which will harmonize with the car body or trim.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. A tail pipe spout comprising, an integral one piece tubular member having a continuous wall adapted to slidably receive a motor vehicle exhaust tail pipe, said tubular member wall being provided along a major part of its length with a pair of longitudinally extending diverging flat portions on the inner end thereof and adapted to seat an exhaust tail pipe with a solid full-line contact between each of said portions and the exhaust tail pipe, the portion of said wall opposite said flat portions being of a different contour than said flat portions and being spaced from a tail pipe seated on said flat portions, and longitudinally separated securing means carried by said tail pipe spout opposite to said flat portions and operative to hold an exhaust tail pipe against said portions.

2. The invention as set forth in claim 1 wherein, said securing means comprises a pair of bolts threaded into the member and extending transversely thereof and substantially perpendicular to and intersecting the axis thereof, said bolts being supported on said wall portion opposite said flat portion.

3. The invention as set forth in claim 2 wherein, said bolts have long flats formed as opposite sides of the threaded portions thereof.

4. The invention as set forth in claim 2, wherein said member has apertures formed therein opposite said flat portions and nuts aligned with said apertures and welded to the member to provide threaded means receiving said bolts.

5. The invention as set forth in claim 1, wherein said securing means comprises a plurality of spaced members adjustably carried by said tubular member and adapted to abut an exhaust tail pipe and hold it against said flat portions.

6. The invention as set forth in claim 5, wherein said spaced members are threadedly mounted on the lower side of said tubular member and are longitudinally spaced.

7. A tail pipe spout comprising, a tubular member having the inner end adapted to slidably receive the end of a motor vehicle exhaust tail pipe and to have a solid full-line contact therebetween, said inner end being integral with an upper V-shaped clamping member adapted to engage the upper side of an exhaust tail pipe, said upper clamping member including a pair of arms joined together and disposed tangent to the generatrix of said tubular member, said arms each having an outwardly extending flange on the outer end thereof, a lower adjustable V-shaped clamping member having an outwardly extending flange on each outer end thereof and being adapted to engage an exhaust tail pipe in a position opposite said upper clamping member, and means adapted to detachably fasten said flanges together to rigidly lock the tail pipe spout on an exhaust tail pipe.

8. A tail pipe spout comprising, a tubular member having the inner end formed with an integral V-shaped clamping member and adapted to slidably receive the end of a motor vehicle exhaust tail pipe and to have a solid full-line contact therewith, said integral clamping member having two arms joined together at one end and disposed tangent to the generatrix of said tubular member, said arms having an outwardly extending flange on the outer ends thereof provided with upturned edges, said flanges being coplanar and having an aperture therethrough, a threaded nut seated within and held in place by said upturned edges, an adjustable V-shaped clamping member having a pair of outwardly extending coplanar flanges on the outer ends thereof and being adapted to engage an exhaust tail pipe in a position opposite said integral clamping member, said adjustable clamping flanges each having a threaded bolt mounted in an aperture therethrough adapted to threadably engage said nuts.

9. In a tail pipe spout construction, a clamping means comprising, a pair of oppositely disposed V-shaped members adapted to engage a motor vehicle exhaust tail pipe, said members being substantially similar in shape with one of them formed integral with the spout, said members having an outwardly extending flange on each end provided with an aperture therethrough, the flanges of one of said members being provided with upturned edges adapted to engage and retain a threaded nut against rotation, and the flanges of the other member having threaded bolts mounted in the apertures therethrough and adapted to engage said nuts.

10. In a tail pipe extension, a one piece tubular member with a continuous wall having an inner end to telescopically fit over a tail pipe and an outer end serving as an outlet for gases from the tail pipe, means on said member providing longitudinal line contact between it and a tail pipe along substantially the entire coextensive portions of the member and tail pipe to provide for clamping engagement of the tail pipe against said means, said last means including a pair of diverging flat planes formed in the wall of the member and contacting a tail pipe as tangents thereto, the portion of said wall opposite to said flat planes being of a different contour and being spaced from and out of contact with a tail pipe that is in contact with said flat planes, and means for holding said planes in contact with a tail pipe.

11. The invention set forth in claim 10 wherein said flat planes extend along a major part of the length of said member.

12. The invention set forth in claim 10 wherein said member is circular in cross section and said planes are tangent to the inner circumference of the member.

13. In a tail pipe extension, a one piece tubular member with a continuous wall having an inner end to telescopically fit over a tail pipe and an outer end serving as an outlet for gases from the tail pipe, means on said member providing longitudinal line contact between it and a tail pipe along substantially the entire coextensive portions of the member and tail pipe to provide for clamping engagement of the tail pipe against said means, said last means including a pair of diverging flat planes formed in the wall of the member and contacting a tail pipe as tangents thereto, the portion of said wall opposite to said flat planes being spaced from and out of contact with a tail pipe that is in contact with said flat planes, and means for holding said planes in contact with a tail pipe.

References Cited in the file of this patent

UNITED STATES PATENTS

| | | |
|---|---|---|
| D. 160,534 | Postelnek | Oct. 17, 1950 |
| 78,899 | Smith | June 16, 1868 |
| 1,854,478 | Meyers | Apr. 19, 1932 |
| 2,098,687 | Kinsfather | Nov. 9, 1937 |
| 2,161,895 | Brenner | June 13, 1939 |
| 2,455,285 | Versaw | Nov. 30, 1948 |
| 2,466,307 | Di Renna | Apr. 5, 1949 |
| 2,551,782 | Zaske | May 8, 1951 |
| 2,630,835 | Russell | Mar. 10, 1953 |
| 2,674,087 | Russell | Apr. 6, 1954 |